Nov. 8, 1949     L. R. TWYMAN     2,487,618
HYDRAULIC STEERING POWER TRANSMISSION
Filed Oct. 18, 1946     3 Sheets-Sheet 1
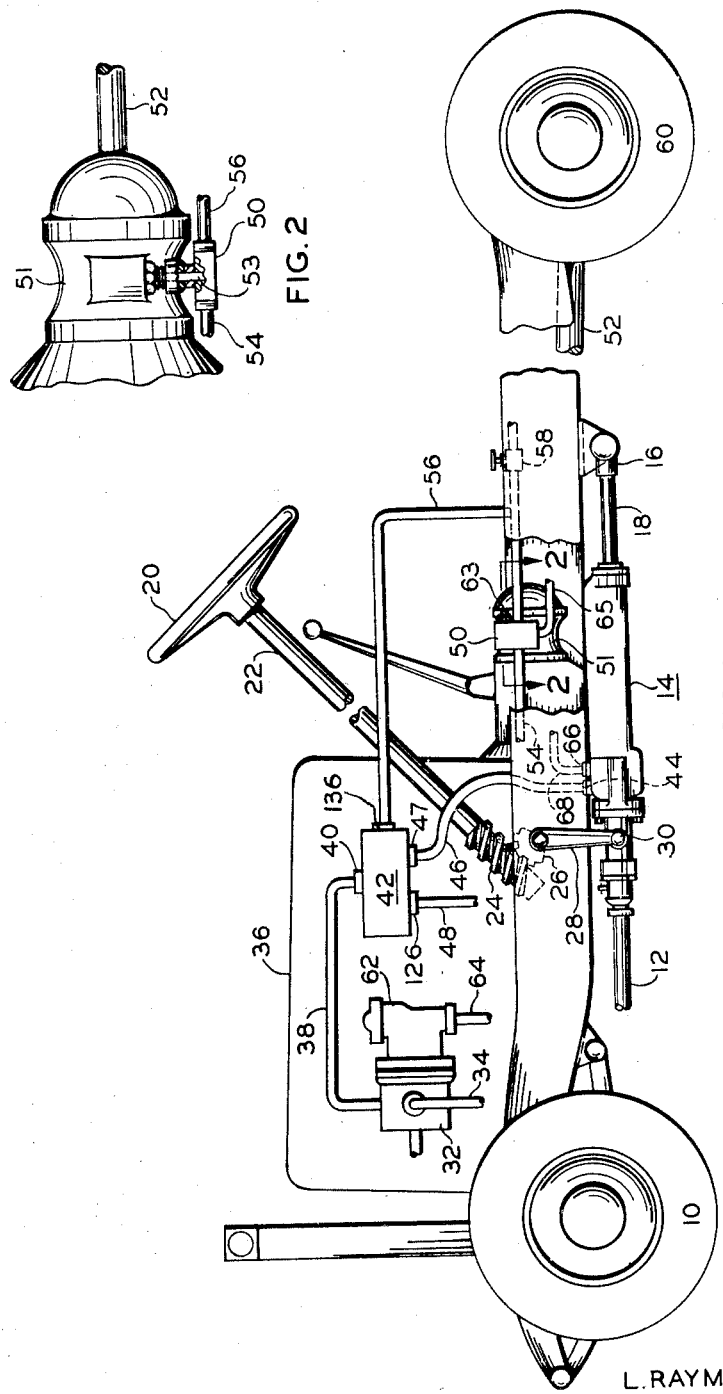
INVENTOR.
L. RAYMOND TWYMAN
BY Ralph L. Tweedale
ATTORNEY Nov. 8, 1949　　　L. R. TWYMAN　　　2,487,618

HYDRAULIC STEERING POWER TRANSMISSION

Filed Oct. 18, 1946　　　3 Sheets-Sheet 2

*INVENTOR.*
L. RAYMOND TWYMAN
BY *Ralph L. Tweedale*
ATTORNEY

Nov. 8, 1949     L. R. TWYMAN     2,487,618
HYDRAULIC STEERING POWER TRANSMISSION
Filed Oct. 18, 1946     3 Sheets-Sheet 3

*INVENTOR.*
L. RAYMOND TWYMAN
BY *Ralph L. Tweedale*
ATTORNEY

Patented Nov. 8, 1949

2,487,618

UNITED STATES PATENT OFFICE 2,487,618

HYDRAULIC STEERING POWER TRANSMISSION

L. Raymond Twyman, Bloomfield Township, Oakland County, Mich., assignor to Vickers Incorporated, Detroit, Mich., a corporation of Michigan Application October 18, 1946, Serial No. 704,187

11 Claims. (Cl. 180—79.2)

1

This invention relates to power transmissions, particularly to those of the type comprising two or more fluid pressure energy translating devices, one of which may function as a pump and another as a fluid motor.

This invention particularly relates to a hydraulic power transmission system for power steering the dirigible wheels of a vehicle and for providing snubbing action for preventing too rapid directional change of said wheels.

It is well known that in manually steering a vehicle considerably more effort is required to steer the vehicle while at rest than while in motion because of the difference in the resistance against the steering effort caused by static and dynamic friction. It is also well known that the dynamic frictional resistance opposed to the manual steering effort decreases as the speed of the vehicle increases.

In the past where means have been provided for power steering of a vehicle, it has been the custom to provide for power steering at all speeds of the vehicle. Where this was accomplished hydraulically, and a fixed displacement pump driven by the engine was used with a power booster associated with the dirigible wheels and the manual steering mechanism, the power steering of the dirigible wheels was accelerated proportionately to the acceleration of engine speed because of the increased displacement of the pump. This problem of accelerated speed of power steering proportionate to increased engine speed was solved in some cases by the use of a variable delivery pump which materially increased the cost of power steering because of the difference in cost between fixed displacement and variable displacement pumps.

It is therefore an object of this invention to provide a hydraulic power transmission system for power steering the dirigible wheels of a vehicle when the vehicle is at rest and moving at low speeds.

It is also an object of this invention to provide a hydraulic power transmission system for the above purpose which will furnish safety snubbing action at high speeds for preventing too rapid directional change of the dirigible wheels in case of a tire blow out or the meeting of road obstructions by said wheels.

It is a further object of this invention to provide a hydraulic transmission incorporating a fluid pump and servo-motor for power steering of the dirigible wheels of a vehicle which will actuate the motor for power steering only at low vehicle speeds when the frictional resistance against

2 manual steering is the greatest and which will inactivate the motor for power steering at higher speeds when power steering is not necessary.

Further objects and advantages of the present invention will be apparent from the following description, reference being had to the accompanying drawings wherein a preferred form of the present invention is clearly shown.

In the drawings:

Figure 1 is a diagrammatic view of the chassis of a vehicle incorporating a hydraulic power transmission system embodying a preferred form of the present invention.

Figure 2 is a view taken from line 2—2 of Figure 1.

Figure 3:
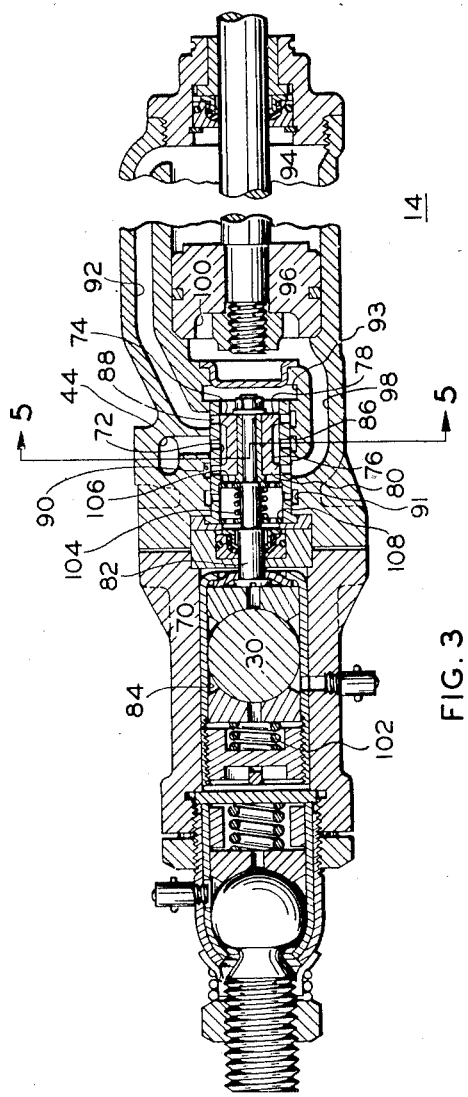
Figure 3 is a sectional view of a servo-motor incorporated in the hydraulic transmission shown in Figure 1.

Referring now to Figure 1, there is shown the chassis of a vehicle, the dirigible wheels 10 of which are connected by means of a drag link 12 to one end of a servo-motor 14, the opposite end of which is connected to the chassis by means of a universal joint 16 connected to a piston rod 18 extending from the motor 14. The dirigible wheels 10 may be manually steered by means of a steering wheel 20 connected to a steering post 22 having a worm 24 which meshes with a steering sector 26, the latter of which is rigidly connected to a Pitman steering arm 28 by means of a squared shaft. The Pitman arm 28 is connected at its opposite end to the booster 14 by means of a ball 30.

A fixed displacement pump 32 connected to a tank, not shown, by means of a conduit 34 is driven by the vehicle engine indicated by the numeral 36 in the well known manner. A pressure delivery conduit 38 connected to pump 32 is connected to a pressure port 40 of a pressure responsive control valve 42. The valve 42 in one position will direct pressure fluid to a pressure port 44 of the servo-motor 14 by means of a flexible conduit 46 connected to a motor port 47 of the valve 42 and in another position will by-pass the flow of pressure fluid from the pump 32 to the tank by connecting conduit 38 to a conduit 48 which is connected to the tank.

As the invention contemplates that power steering shall only take place at low vehicle speeds and while the vehicle is at rest with the engine running, means have been provided for cutting off the servo-motor 14 for use as a power booster at higher speeds. Although several means may be adapted to perform this result, the invention in its preferred form makes use of hydraulic governor means which at a predetermined speed of the driving wheels will shift the control valve 42 to cut off the power from pump 32 to the motor 14.

Hydraulic governor means for shifting the control valve 42 to by-pass the pump 32 to the tank is provided by means of a pump 50 of smaller capacity than pump 32 which is mounted on a speedometer drive housing of the vehicle indicated by the numeral 51 and shown more clearly in Figure 2. A shaft 53 of the pump 50 extends into the housing 51 so as to be driven by the speedometer drive gears, not shown, in a suitable manner. The speedometer drive gears are associated in the conventional manner, not shown, with a drive shaft 52 of the vehicle. Thus, the pump 50 is not only associated with the speedometer drive but also with the drive shaft of the vehicle and the displacement from the pump 50 will increase as the speed of the vehicle increases.

The pump 50 is connected to the tank by means of a conduit 54 and a pump delivery conduit 56 thereof is connected to the tank and to the control valve 42. An adjustable orifice 58 incorporated in the pump delivery conduit 56 is so originally adjusted that the full delivery from pump 50 will be discharged to the tank at low speeds of the vehicle. However, at a predetermined higher speed of the driving wheels, indicated by the numeral 60, which are associated with the drive shaft 52, the adjustable orifice 58 will create a resistance to increased pump flow sufficient to divert pressure fluid from pump 50 to shift the control valve 42 so as to by-pass the flow from pump 32 to the tank. Both the pump 32 and the pump 50 have integral relief valves, indicated by the numerals 62 and 63, which will relieve excessive pressure fluid from said pumps to the tank by means of conduits 64 and 65 whenever a predetermined pressure has arisen in the system as determined by the setting of the valves.

Although several types of power steering servomotors or boosters may be used in the hydraulic power transmission shown in Figure 1, it is preferred that a servo-motor constructed in accordance with the patent to Vickers No. 2,022,698 be used therein. In addition to the pressure port 44, the motor 14 also has a tank port 66 which is connected to the tank by means of a flexible conduit 68. As shown in Figure 3, servo-motor 14 comprises a cylinder 70 having a valve chamber 72 in which is reciprocably mounted a valve 74 having longitudinal grooves 76 formed between extreme end lands 78 and 80. The valve 74 is connected by means of a valve stem 82 with an actuating slide 84 contained in the cylinder 70 which is associated with a threaded projection extending from the cylinder, the former of which forms part of the drag link and which is bolted to the cylinder. Formed in the chamber 72 is a central annular recess 86 connected to the inlet port 44 and annular recesses at the right and left, respectively, thereof indicated by the numerals 88 and 90. In addition, annular recesses 91 and 93 are formed at the left and right end of valve 74 within the main chamber 72. The recess 88 communicates with a conduit 92 that in turn connects with a chamber 94 to the right of a piston 96 which is connected to the piston rod 18. The recess 90 connects by means of a conduit 98 with a chamber 100 to the left of the piston 96.

The ball 30 is connected by suitable bearing blocks and a pick-up spring 102 with the slide 84 which in turn connects with the valve stem 82. A centering spring 104 and discs 106 and 108 are positioned between the slide 84 and the valve 74.

In the neutral position with pump 32 connected to the port 44 of motor 14, valve 74 is adapted to admit pressure fluid to chambers 94 and 100 to maintain the motor in a state of equilibrium resulting in directional stability of the dirigible wheels. When manually steering the vehicle in case of power failure at low speeds or when the displacement from pump 32 is by-passed around motor 14 at higher speeds, fluid may be displaced from and directed to the opposite chambers 94 and 100 by means of a check valve 110 and conduits shown more clearly in Figures 4 and 5.

Figure 4:
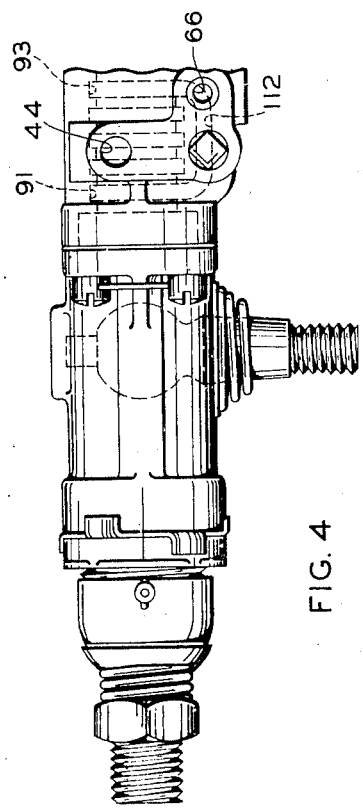
Figure 4 is an elevational view of the servo-motor shown in Figure 2.
Figure 5:
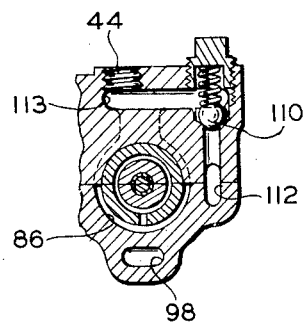
Figure 5 is a sectional view taken on line 5—5 of Figure 3.

A passageway 112 connects the annular chambers 91 and 93 and with the port 66 of motor 14 as best shown in dotted lines in Figure 4. The check valve 110 is connected to the passage 112 to permit free flow to the port 44 by means of a passage 113 when pump pressure does not hold the check valve 110 closed. The lands 78 and 80 of valve 74 are very accurately related to the annular grooves 88 and 90, the latter being only slightly wider than the lands so as to leave a very small clearance on each side. In the neutral position of the valve 74, the ports created by this slight clearance are in effect orifices which cause a pressure to be built up on both sides of the piston 96 to keep the motor 14 in a state of equilibrium.

Figure 6:
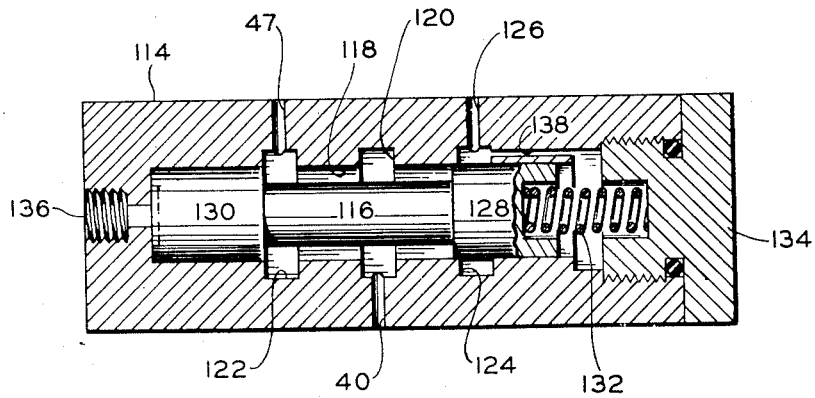
Figure 6 is a sectional view of a control valve incorporated in the hydraulic transmission shown in Figure 1.

Referring now to Figures 1 and 6, control valve 42 comprises a housing 114 containing a valve spool 116 reciprocably mounted in a bore 118. The bore 118 is provided with an annular pressure port 120 connected to the pressure port 40, an annular motor port 122 connected to external motor port 47 and an annular tank port 124 connected to an external tank port 126. The spool 116 is provided with extreme right and left end lands 128 and 130, respectively, and is biased to the leftward position by means of a spring 132 of predetermined resistance mounted in the right end of bore 118, the latter of which is closed by a plug 134 adapted to limit rightward movement of spool 116.

Normally, pressure port 40 is connected to motor port 47 but by means of pressure fluid admitted to the left end of bore 118 by means of a port 136, the spool 116 may be shifted rightwardly to connect the pressure port 40 to tank port 126 while blocking the motor port 47. Fluid displaced from the right end of bore 118 is directed to the tank by means of a passage 138 connected to tank port 126.

Pressure fluid from the auxiliary pump 50 will shift the control valve 42 at a vehicular speed, or speed of the driving wheels of the vehicle, sufficient to cause a displacement of the pump 50 which the orifice 58 is originally adjusted to resist.

In operation with the engine running and driving pump 32 and the vehicle at rest, the dirigible wheels 10 may be power steered as follows: Any turning of the steering wheel 20 will result in a movement of the valve 74 because of the drag link 12 being connected thereto by means of valve stem 82 and slide 84. If the valve 74 is moved, for instance to the left, pressure fluid from pump 32 is directed to chamber 100 and the left side of piston 96 to shift the cylinder 70 to the left. Pressure fluid from pump 32 is directed to chamber 100 by means of pump delivery conduit 38, control valve 42 (which is in the position shown in Figure 6), conduit 46, pressure port 44 of motor 14, recess 86, groove 76 of valve 74, recess 90 and conduit 98.

Displaced fluid from chamber 94 may flow to the tank by means of passage 92, recesses 88 and 93, passage 112, tank port 66 and conduit 68. If the valve 74 is moved to the right, pressure fluid from pump 32 is directed to the chamber 94 to the right of the piston 96 to shift the cylinder 70 to the right by means of pressure port 44, central recess 86, grooves 76, recess 88 and conduit 92. Displaced fluid from chamber 100 may flow to the tank by means of conduit 98, recess 90, chamber 91, passage 112, tank port 66 and conduit 68.

Immediately upon the valve being shifted slightly to the right to open up port 88 to chamber 94 or shifted to the left to open up port 90 to chamber 100, pressure fluid from pump 32 is admitted to the proper chamber in order to shift the cylinder 70 for power steering of the dirigible wheels 10. When the steering of wheel 20 ceases, there is a slight continued movement of the cylinder 70 to place the valve 74 again in a neutral position during which pressure fluid is admitted to both chambers 100 and 94 to hold the dirigible wheels in steered position. Any tendency of the cylinder 70 to drag the valve 74 along after the steering effort has ceased will be resisted by the light spring 104.

When the vehicle is in motion up to a predetermined speed of the driving wheels 60, the same action will take place, namely, immediate power steering of the dirigible wheels as previously described upon turning of the steering wheel 20 in either direction. In addition, in case of the meeting of road obstructions by the dirigible wheels or a sudden flat tire, a directional change of the dirigible wheels is resisted by equalized pressure in chambers 94 and 100. Any sudden shock tending to shift the cylinder 70 will open one of the small port openings of the valve 74 to cause a differential pressure to be immediately created tending to draw the drag link 12 and cylinder 70 back to neutral position to correct the direction of the wheels so as to give directional stability.

It should be noted that there is a sharp distinction between the relative movements of the cylinder 70 and the valve 74 when power steering the vehicle and in case of the dirigible wheels meeting sudden shocks. In the former case, upon a slight manual steering effort, the valve 74 will shift a slight fraction of an inch to open fully one of the ports 88 or 90 to pump 32 and the other port thereof to the tank and the cylinder 70 will immediately follow up the movement of the valve 74. Upon completion of the steering operation desired, there is a continued slight movement of the cylinder 70 so as to place the valve 74 again in the neutral position to hold the dirigible wheels on the steered course.

With the pump 32 connected to the port 44 of motor 14 when the dirigible wheels meet with sudden road shocks, however, the cylinder 70 rather than the valve 74 tends to move slightly which opens up one of the valve ports 88 or 90 to immediately cause a differential pressure to be created on opposite sides of the piston 96 and force the cylinder back in the opposite direction to again place the valve 74 in a neutral position.

Up to a predetermined speed of the driving wheels 60, the full displacement from the pump 50 is directed to the tank through the orifice 58. However, as the speed of the drive shaft increases the speed of the driving wheels will increase in proper ratio thereto and the displacement from the pump 50 will increase. When the speed of the driving wheels associated with the drive shaft reaches a predetermined maximum, the displacement from pump 50 will be of such volume that the orifice 58 no longer will pass the complete displacement without creating a resistance sufficient to divert a portion of the flow from pump 50 to the pressure port 40 of valve 42. The resistance created by the orifice 58 results in a build-up of pressure sufficient to overcome the resistance of spring 132 to shift the valve spool 116 to the right. In this position of the spool 116, the land 130 blocks the pressure port 40 from communication with the motor port 47 and connects the pressure port 40 to the tank port 126 so as to by-pass the complete flow from the pump 32 to the tank and unload the pump.

It should now be noted that with the pump 32 cut off from the motor 14, that power steering of the dirigible wheels 10 is not possible. At and over a predetermined speed of the driving wheels 60, the displacement from pump 50 is greater than the orifice 58 is originally adjusted to pass without resulting in a continuous pressure at port 136 to keep spool 116 shifted to the right and causing the complete flow of fluid from pump 32 to be by-passed around the motor 14 to the tank.

Manual steering is not affected due to the manual steering mechanism being associated with the cylinder 70 which forms a part of the drag link 12 to the dirigible wheels. As in the former case of power steering when the steering wheel 20 is turned, the first movement will be that of the valve 74 followed almost immediately by movement together of the valve 74 and cylinder 70. In manually steering the dirigible wheels, fluid may be displaced from one side to the other of the piston 96 by means of the by-pass check valve 110 and the passages shown in Figures 4 and 5. When the cylinder moves leftwardly, fluid is displaced from chamber 94 to chamber 100 by means of conduit 92, annular recess 88, chamber 93, passage 112, check valve 110, passage 113, recess 86, groove 76 of valve 74, annular recess 90 and passage 98. When the cylinder moves rightwardly, fluid may be displaced from chamber 100 to chamber 94 by means of conduit 98, annular recess 90, chamber 91, passage 112, check valve 110, passage 113, annular recess 86, groove 76, recess 88 and conduit 92.

Although pump 32 has been cut-off from motor 14 directional stability of the dirigible wheels will be maintained in a slightly different manner than described with the pump 32 connected to the motor 14 at low vehicle speeds.

Any tendency of the cylinder 70 to shift rightwardly or leftwardly when sudden road shocks are met by the dirigible wheels is almost immediately resisted and prevented in the following manner.

If the dirigible wheels tend to shift the cylinder 70 leftwardly, fluid must be displaced from chamber 94. After a slight fraction of an inch movement to the left of the cylinder 70, port 88 is fully open to recess 86 and port 44. Due to the fact that port 47 of valve 42 is blocked by land 128 of spool 116 and check valve 110 prevents flow from passage 113 to passage 112, it is impossible for fluid to escape from chamber 94 so that the dirigible wheels will be held on a steady course. If the dirigible wheels tend to shift the cylinder to the right, fluid must be displaced from chamber 100. After a slight fraction of an inch movement to the right of the cylinder 70, port 90 is fully open to recess 86 and port 44. As in the former instance due to the fact that port 47 of valve 42 is blocked by land 128 of spool 116 and check valve 110 prevents flow from passage 113 to passage 112, it is impossible for fluid to escape from chamber 100 so that similarly the wheels are again held on a steady course.

Consequently, although the motor 14 at higher speeds will not act as a booster for power steering of the dirigible wheels, it will act to prevent sudden directional change of the dirigible wheels caused by the meeting of road obstructions or tire blow-outs.

While the form of embodiment of the invention as herein disclosed constitutes a preferred form, it is to be understood that other forms might be adopted, all coming within the scope of the claims which follow.

What is claimed is as follows:

1. In a vehicle having mechanism for manual steering of the dirigible wheels thereof, a hydraulic power transmission system comprising in combination a fluid pump, hydraulic steering servo-motor means, control means connecting the pump to the motor for power steering the dirigible wheels, and means responsive at a predetermined speed of the vehicle for causing the control means to disconnect the pump from the motor and inactivate the motor for power steering.

2. In a vehicle having mechanism for manual steering of the dirigible wheels thereof, a hydraulic power transmission system comprising in combination a fluid pump, hydraulic steering servo-motor means connected to the manual steering mechanism and the dirigible wheels and hydraulically connected to the pump to receive fluid therefrom, control means for activating the motor at low speeds of the vehicle for power steering of the dirigible wheels, and hydraulic governor means connected to the control means for inactivating the motor at a predetermined higher speed of the vehicle.

3. In a vehicle having mechanism for manual steering of the dirigible wheels thereof, a hydraulic power transmission system comprising in combination a fluid pump, hydraulic servo-motor means connected to the manual steering mechanism and the dirigible wheels, a pressure responsive control valve biased to connect the pump to the motor for power steering the dirigible wheels and hydraulic governor means connected to the control valve for causing the latter at a predetermined speed of the vehicle to short circuit and inactivate the motor for power steering the dirigible wheels.

4. In a vehicle having mechanism for manual steering of the dirigible wheels thereof, a fluid pump, hydraulic steering servo-motor means connected to the manual steering mechanism and the dirigible wheels, the combination therewith of control valve means adapted to connect the pump to the motor for power steering of the vehicle and means responsive at a predetermined vehicular speed for shifting the control valve to short circuit the pump and inactivate the motor for power steering of the vehicle.

5. In a vehicle having an engine mechanically associated with the driving wheels of the vehicle and mechanism for manual steering mechanically associated with the dirigible wheels of the vehicle, a hydraulic power transmission system comprising in combination a fluid pump driven by the engine, hydraulic steering servo-motor means connected to the steering mechanism and the dirigible wheels, governor means connected to the driving wheels and means connected to the pump, motor and governor means for causing power steering of the dirigible wheels by the motor when the driving wheels are idle and rotating at low speeds and for inactivating the motor for power steering with the driving wheels rotating at a predetermined higher speed.

6. In a vehicle having an engine mechanically associated with the driving wheels of the vehicle and mechanism for manual steering connected to the dirigible wheels of the vehicle, a hydraulic power transmission system comprising in combination a fluid pump driven by the engine, hydraulic steering servo-motor means mechanically connected to the steering mechanism and the dirigible wheels, pressure responsive control valve means normally connecting the pump to the motor for power steering of the dirigible wheels and hydraulic governor means mechanically connected to the driving wheels and hydraulically connected to the control valve means and responsive at a predetermined speed of the driving wheels for shifting the control valve to short circuit the pump and inactivate the motor for power steering of the dirigible wheels.

7. In a vehicle having an engine and a drive shaft mechanically associated therewith and with the driving wheels of the vehicle a hydraulic power transmission system comprising in combination a fluid pump driven by the engine, hydraulic steering servo-motor means, control means for connecting the pump to the motor for power steering of the vehicle and governor means connected to the drive shaft and the control means for causing the control means to disconnect the pump from the motor at a predetermined speed of the vehicle.

8. In a vehicle having an engine, a drive shaft mechanically associated therewith and with the driving wheels of the vehicle and mechanism for manual steering mechanically associated with the dirigible wheels of the vehicle, a hydraulic power transmission system comprising in combination a fluid pump driven by the engine, hydraulic steering servo-motor means mechanically connected to the steering mechanism and the dirigible wheels, control means connecting the pump to the motor for power steering of the dirigible wheels and governor means connected to the drive shaft and the control means for causing the control means to short circuit the pump and inactivate the motor for power steering at a predetermined vehicular speed.

9. In a vehicle having mechanism for manual steering of the dirigible wheels thereof, a fluid pump, and hydraulic servo-motor means connected to the manual steering mechanism and the dirigible wheels, said motor means including means for preventing rapid directional change of the dirigible wheels in case of motor inactivation, in combination therewith means for activating the motor at low vehicular speeds for power steering of the dirigible wheels and governor means connected to the activating means for inactivating the motor for power steering at a predetermined higher vehicular speed.

10. In a vehicle having an engine mechanically associated with the driving wheels of the vehicle and mechanism for manual steering mechanically associated with the dirigible wheels of the vehicle, a hydraulic power transmission system comprising in combination a fluid pump driven by the engine, hydraulic steering servo-motor means connected to the manual steering mechanism and the dirigible wheels adapted for power steering of the latter, said motor means including snubbing means for preventing too rapid directional change of the dirigible wheels when the motor is power inactivated, control means connected to the pump and motor for activating the motor for power steering when the engine is running and at low speeds of the driving wheels and governor means connected to the driving wheels and the control means for causing the control means to inactivate the motor for power steering at a predetermined higher speed of the driving wheels.

11. In a vehicle having mechanism for manual steering of the dirigible wheels thereof, a hydraulic power transmission system comprising in combination hydraulic steering servo-motor means connected to the manual steering mechanism and to the dirigible wheels, a fluid pump connected to the motor for activating the motor for power steering of the dirigible wheels, and hydraulic governor means responsive at a predetermined speed of the vehicle and disconnecting the pump from the motor for inactivating the motor.

L. RAYMOND TWYMAN.

REFERENCES CITED

The following references are of record in the file of this patent:

UNITED STATES PATENTS

| Number | Name | Date |
| --- | --- | --- |
| 2,341,502 | Ingres | Feb. 8, 1944 |
| 2,356,492 | Smith | Aug. 22, 1944 |